US006017124A

United States Patent [19]

Siems

[11] Patent Number: 6,017,124

[45] Date of Patent: Jan. 25, 2000

[54] SHIELDING DEVICE FOR THE REDUCTION OF UNWANTED REFLECTION FROM AN OVERHEAD PROJECTOR

[76] Inventor: Kent Siems, 6425 Scott St., Davenport, Iowa 52806

[21] Appl. No.: 09/104,677

[22] Filed: Jun. 25, 1998

[51] Int. Cl.[7] .......... G03B 21/14

[52] U.S. Cl. .......... 353/97; 353/DIG. 5

[58] Field of Search .......... 353/97, 119, DIG. 3, 353/DIG. 4, DIG. 5

[56] References Cited

U.S. PATENT DOCUMENTS 3,733,436 5/1973 Rose .......... 353/97
3,849,598 11/1974 Hoffberger, II et al. .......... 353/97
5,121,984 6/1992 Jones et al. .......... 353/97
5,172,144 12/1992 Hetrick .......... 353/97
5,214,459 5/1993 Al-Ani .......... 353/97
5,469,235 11/1995 Zako .......... 353/97

*Primary Examiner*—William Dowling
*Attorney, Agent, or Firm*—Daniel A Rosenberg; Kent A. Herink; Davis Brown Law Firm

[57] ABSTRACT

The present invention comprises a shielding member located proximate to an overhead projector for reducing unwanted reflection from a writing surface of the overhead projector directed toward a user of the overhead projector. Angled support braces support the shielding member, and attach to the shielding member such that the shielding member tilts at an angle to better intercept the unwanted reflection.

11 Claims, 6 Drawing Sheets

SHIELDING DEVICE FOR THE REDUCTION OF UNWANTED REFLECTION FROM AN OVERHEAD PROJECTOR

BACKGROUND OF THE INVENTION

The present invention relates to a shielding device for the reduction of unwanted reflection from an overhead projector, and in particular to a shielding device comprised of a shielding member secured to support braces for location proximate to the writing surface of an overhead projector thereby reducing unwanted reflection between the writing surface of the overhead projector and a user of the overhead projector.

Users of overhead projectors frequently experience difficulty with bright reflection, or glare, coming from the writing surface of the overhead projector. If the user is positioned at the proper angle to the overhead projector, this reflection can prevent the user from properly utilizing the overhead projector. This forces the user to constantly readjust their position relative to the overhead projector, and frequently disrupts the users presentation. Additionally, the reflection can force the user into an awkward and uncomfortable position in order to use the overhead projector without experiencing unwanted reflection. Accordingly, the present invention substantially eliminates the difficulties encountered heretofore and discussed hereinabove.

SUMMARY OF THE INVENTION

An object of the present invention comprises providing a shielding device for reducing unwanted reflection from an overhead projector.

Another object of the present invention comprises providing a shielding device for an overhead projector that does not interfere with the users ability to interact with the overhead projector.

An additional object of the present invention comprises providing shielding device for an overhead projector that can removably and securably attach to the overhead projector.

These and other objects of the present invention will become apparent to those skilled in the art upon reference to the following specification, drawings, and claims.

The present invention intends to overcome the difficulties encountered heretofore. To that end, the present invention comprises a shielding member located proximate to an overhead projector for reducing unwanted reflection from a writing surface of the overhead projector directed toward a user of the overhead projector. Angled support braces support the shielding member, and attach to the shielding member such that the shielding member tilts at an angle to better intercept the unwanted reflection.

DETAILED DESCRIPTION OF THE INVENTION

Figure 1:
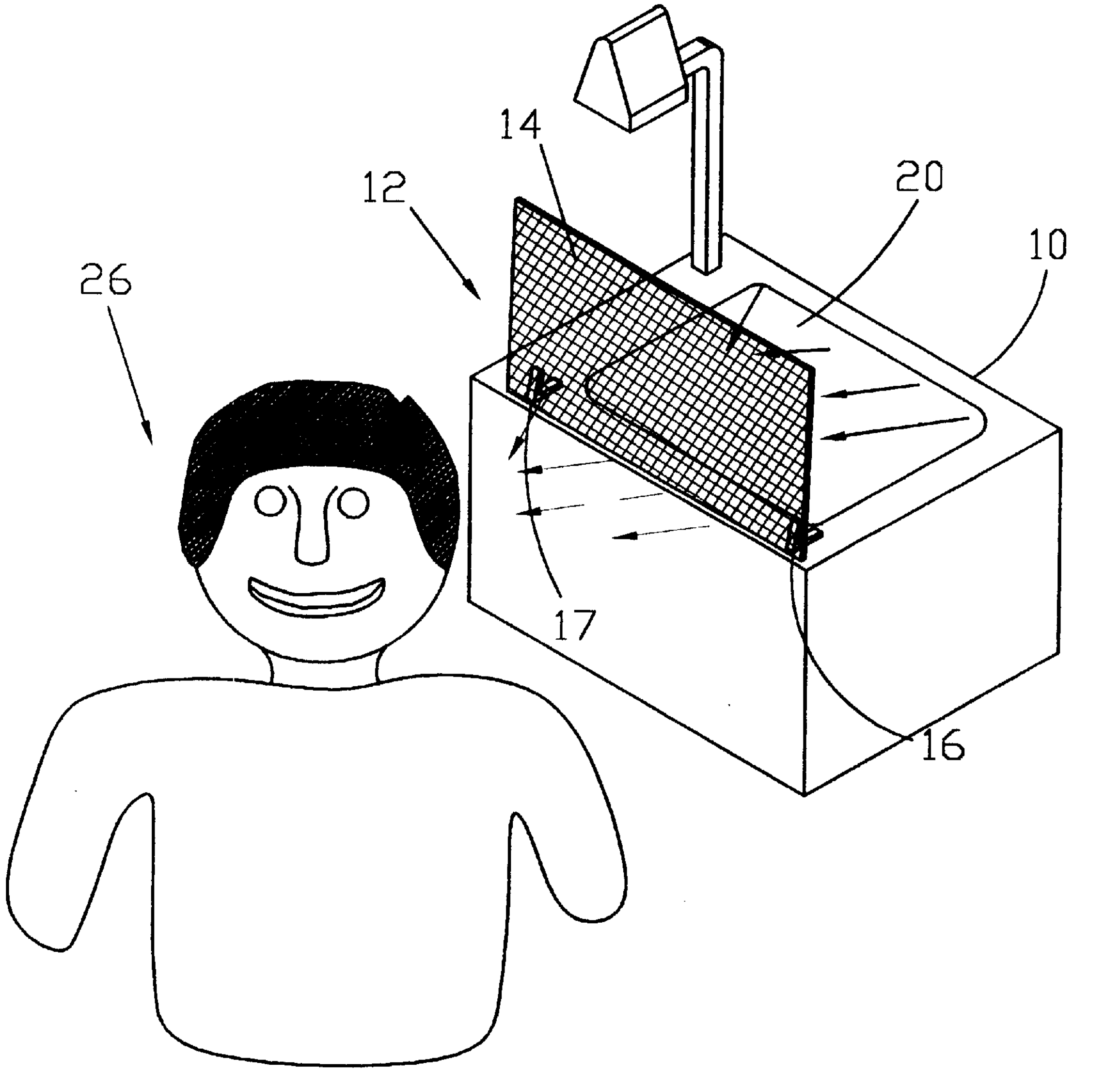
FIG. 1 is perspective view of an overhead projector and of a shielding device.

In the Figures, FIG. 1 shows an overhead projector 10 with a writing surface 20. Located proximate to and atop the overhead projector 10 is a shielding device 12. The shielding device 12 consists of a shielding member 14 and two support braces 16, 17. The shielding member 14 is comprised of darkened Plexiglas, such that the shielding member 14 can absorb reflection coming from the writing surface 20 of the overhead projector 10, directed towards a user 26 of the overhead projector 10. Those skilled in the art will appreciate that any number of materials capable of absorbing unwanted reflection can perform the task contemplated by the shielding member 14 of the present invention.

In the operation of the overhead projector 10 by user 26, in certain positions a large amount of unwanted reflection (indicated in FIG. 1 by darkened arrows) from the writing surface 20 of the overhead projector 10 reflects towards the user 26. This unwanted reflection can distract the user 26 and interrupt the flow of the user's 26 presentation. Thus, positioning the shielding device 12 between the user 26 and the overhead projector 10 substantially eliminates the unwanted reflection. FIG. 1 shows reduced size arrows directed toward the user 26, indicating the reduced reflection.

Figure 2:
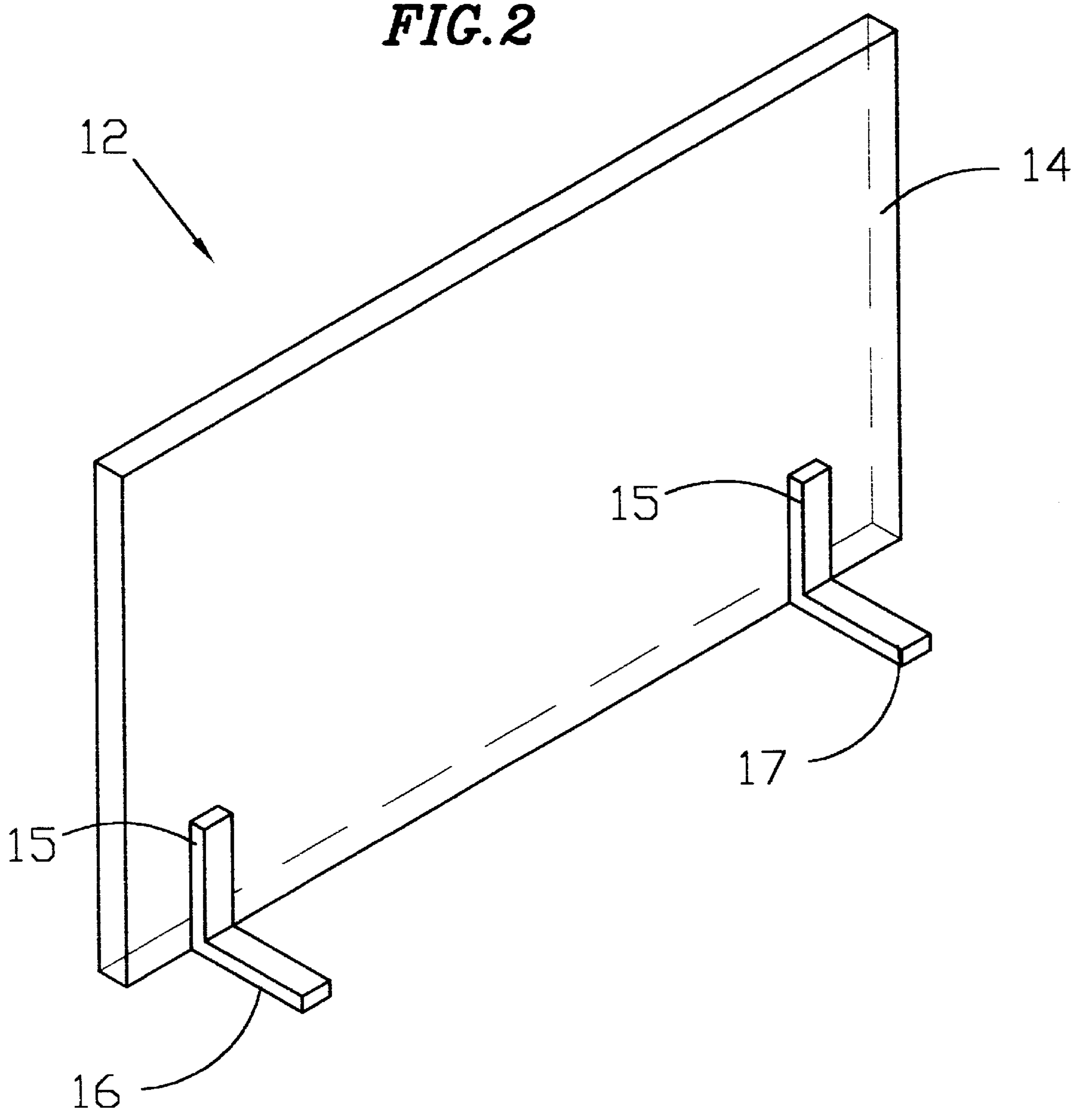
FIG. 2 is a perspective view of the shielding device of FIG. 1.
Figure 4:
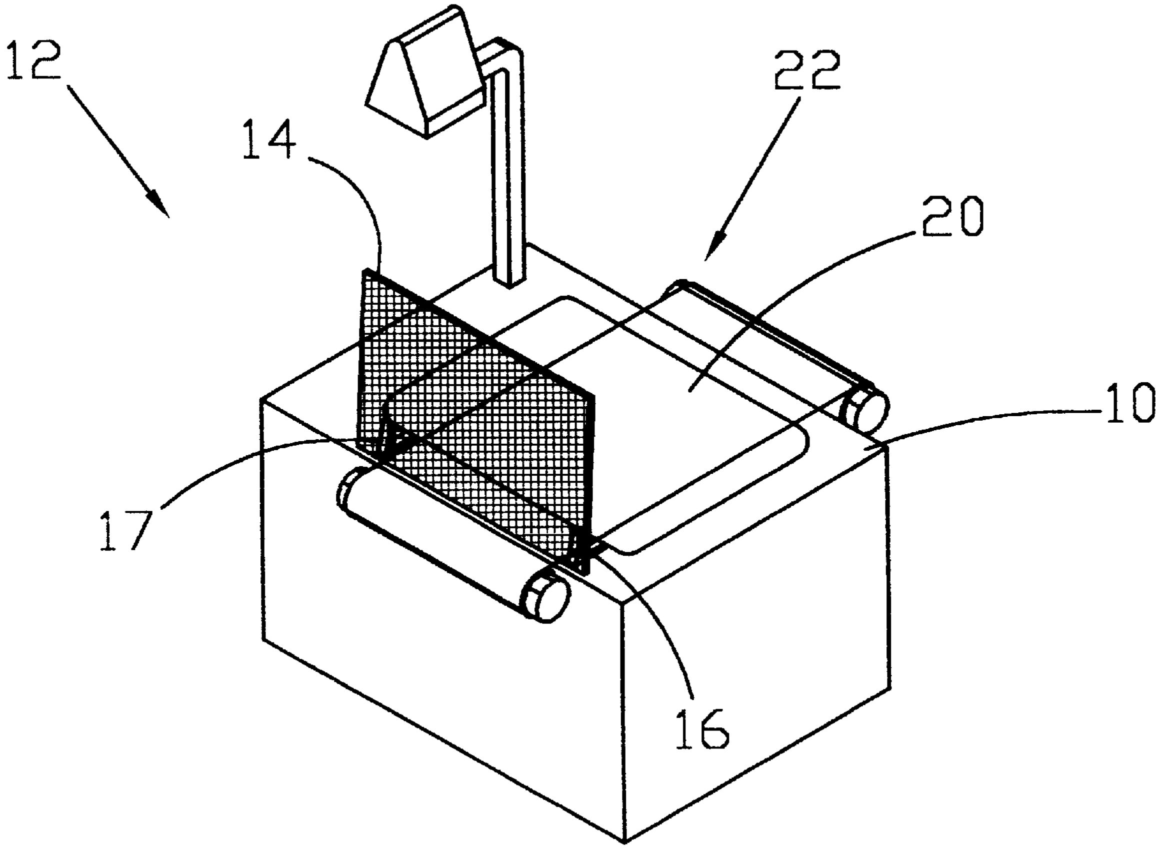
FIG. 4 is a perspective view of an overhead projector with a roll of writing material, and a shielding device.
Figure 5:
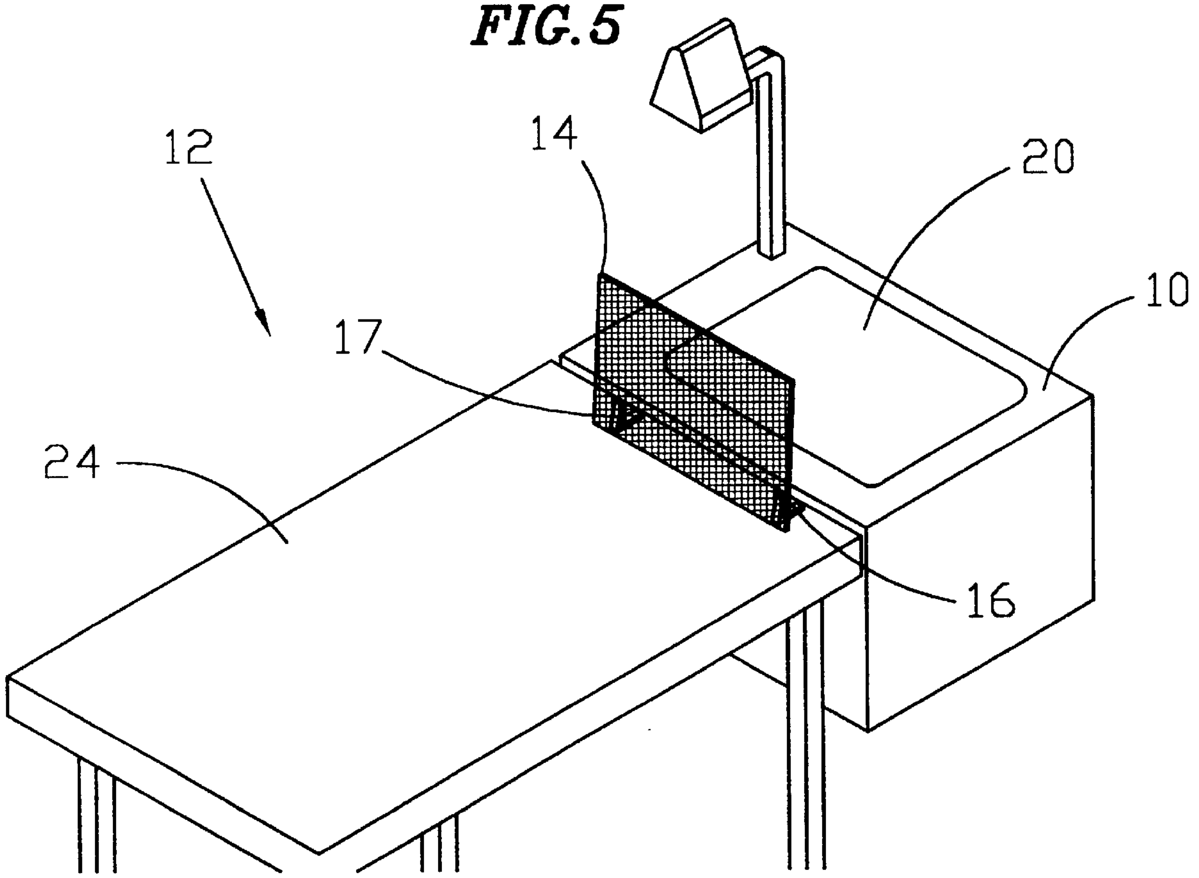
FIG. 5 is a perspective view of an overhead projector and a shielding device located adjacent to the overhead projector.
Figure 6:
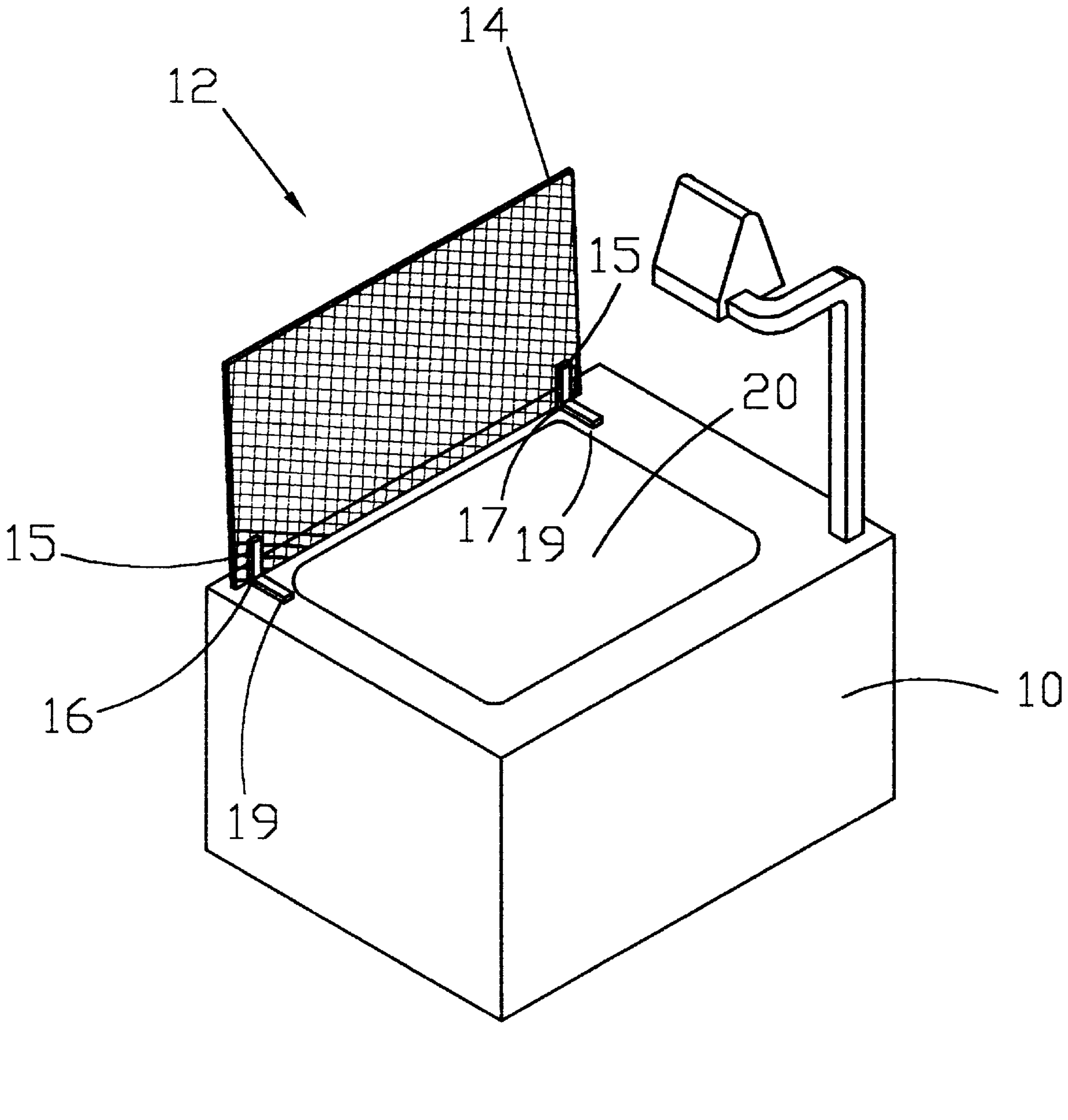
FIG. 6 is a perspective view of an overhead projector and a shielding device showing the support braces.

The shielding device 12 rests upon the overhead projector through support braces 16, 17. The support braces 16, 17 can allow the shielding device 12 to merely rest atop the overhead projector 10, or can removably attach to the overhead projector 10 through the use of conventional hook and loop type fasteners 19 (see FIG. 6). Additionally, the support braces 16, 17 can be removable attached to the shielding member 14 through the use of conventional hook and loop fasteners means 15 (see FIG. 2, 6). The hook and loop fastener means 15, 19 allow removing and relocating the support braces 16 and 17 along the bottom portion of the shielding member 14. In this manner, the shielding device 12 configures to the wide variety of positions atop the overhead projector 10. For example, FIG. 4 shows an overhead projector 10 with a roll of transparent writing material 22. Moving the support braces 16, 17 allows for locating the shielding member 14 of the shielding device 12 such that the writing material 22 moves underneath the shielding member 14. Additionally, the shielding device 12 can rest atop a table 24 located adjacent to the overhead projector 10 (FIG. 5). Consequently, the shielding device 12, located in a wide variety and orientations of positions relative to the overhead projector 10, allows the user 26 a great deal of flexibility in positioning the shielding device 12 to eliminate unwanted reflection between the overhead projector 10 and the user 26.

Figure 3:
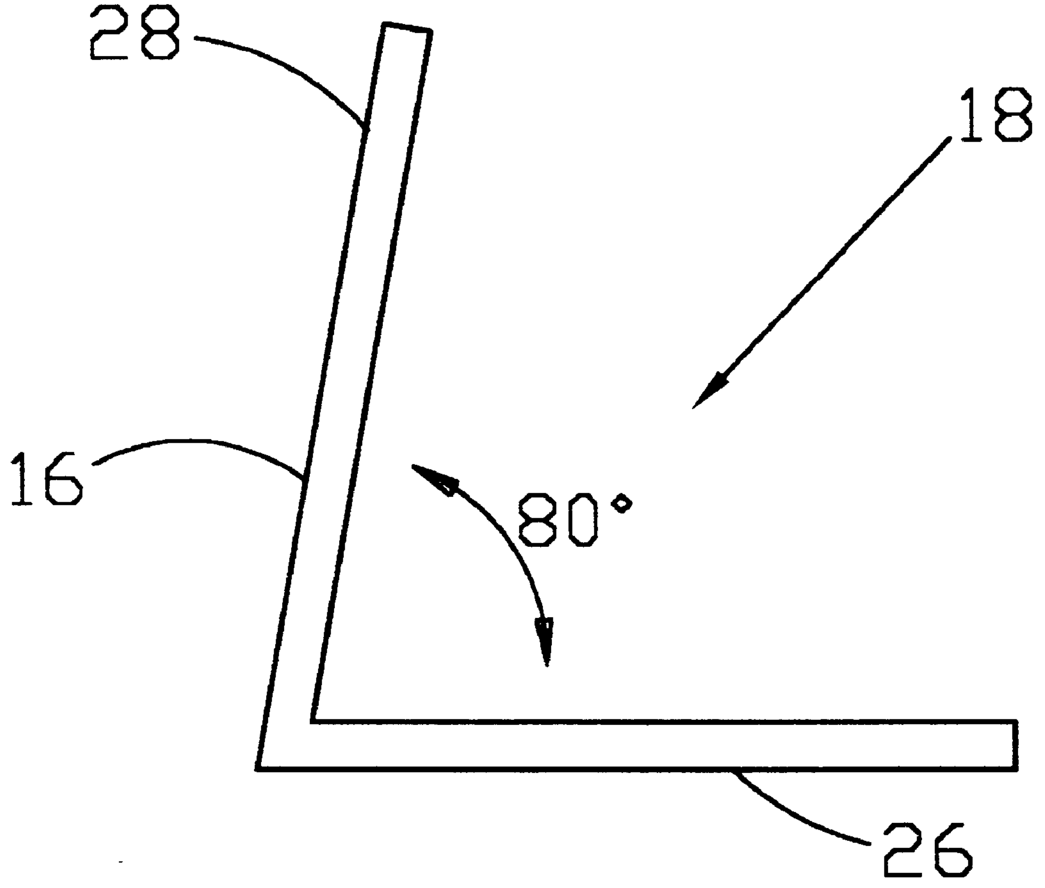
FIG. 3 is a side elevation view of an angled support brace of the shielding device of FIG. 2.

FIG. 3 shows a detailed view of the support brace 16, which is identical to support brace 17 other than in location. The support brace 16 further comprises a first end 28 for attachment to the shielding member 14, and a second end 26 for attachment or location upon the overhead projector 10. Further, ideally the acute angle 18 between the first end 28 and the second end 26 of the support brace 16 equals 80°. Those skilled in the art, however, will realize that the acute angle 18 can vary without departing from the scope of the present invention.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art who have the disclosure before them will be able to make modifications and variations therein without departing form the scope of the invention. For example, the present invention is equally adaptable to either side of the overhead projector to enable use by either right-handed or left-handed users.

I claim:

1. A shielding device for the reduction of unwanted reflection between an overhead projector and a user of the overhead projector, said device comprising:

a) an overhead projector having a writing surface;

b) a shielding member located proximate to said writing surface of said overhead projector thereby reducing unwanted reflection between said writing surface of said overhead projector and a user of said overhead projector;

c) a support brace having a first end and a second end that form an acute angle, wherein said first end is attached to said shielding member, said support brace supporting said shielding member in an angled position to allow said shielding member to reduce said unwanted reflection.

2. The invention in accordance with claim 1 wherein said shielding member is comprised of darkened Plexiglas.

3. The invention in accordance with claim 1 wherein said shielding member is located atop said overhead projector.

4. The invention in accordance with claim 1 wherein said overhead projector further comprises a roll of writing material, and said shielding member is located above said roll of writing material.

5. The invention in accordance with claim 1 wherein said shielding member is located adjacent to said overhead projector.

6. The invention in accordance with claim 1 wherein said support brace is removably attached to said shielding member by a hook and loop fastening means.

7. The invention in accordance with claim 1 wherein said support brace is removably attached to said overhead projector by a hook and loop fastening means.

8. The invention in accordance with claim 1 wherein said acute angle equals 80°.

9. The invention in accordance with claim 1 wherein said support brace further comprises a first end removably attached to said shielding member by a hook and loop fastening means, and a second end removably attached to said overhead projector by a hook and loop fastening means.

10. The invention in accordance with claim 1 further comprising a first support brace and a second support brace, wherein said first and said second support braces are removably attached to said shielding member.

11. A shielding device for the reduction of unwanted reflection between an overhead projector and a user of the overhead projector, said device comprising:

a) an overhead projector having a writing surface;

b) a darkened Plexiglas shielding member located proximate to said writing surface of said overhead projector, thereby reducing unwanted reflection between said writing surface of said overhead projector and a user of said overhead projector;

c) a first support brace with a first end and a second end, wherein said first end of said first support brace removably attaches to said shielding member by a hook and loop fastener means, and said second end of said first support brace removably attaches to said overhead projector by a hook and loop fastener means, and said first end and said second end of said first support brace form an angle of 80°; and d) a second support brace with a first end and a second end, wherein said first end of said second support brace removably attaches to said shielding member by a hook and loop fastener means, and said second end of said second support brace removably attaches to said overhead projector by a hook and loop fastener means, and said first end and said second end of said second support brace form an angle of 80°.

* * * * *